(12) United States Patent
Huebler et al.

(10) Patent No.: US 8,698,012 B2
(45) Date of Patent: Apr. 15, 2014

(54) DYNAMIC SCALE WITH EXTRACTION DEVICE THAT CAUSES STATIC WEIGHING OF IDENTIFIED ITEMS, AND METHOD FOR THE OPERATION THEREOF

(75) Inventors: Uwe Huebler, Neuenhagen (DE); Axel Kieser, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 478 days.

(21) Appl. No.: 13/020,251

(22) Filed: Feb. 3, 2011

(65) Prior Publication Data

US 2011/0206482 A1    Aug. 25, 2011

(30) Foreign Application Priority Data

Feb. 24, 2010 (DE) .......................... 10 2010 009 431

(51) Int. Cl.
| | |
|---|---|
| *G01G 19/413* | (2006.01) |
| *G01G 13/08* | (2006.01) |
| *G07B 17/02* | (2006.01) |
| *G01G 19/40* | (2006.01) |

(52) U.S. Cl.
USPC .................. 177/25.15; 177/145; 705/407

(58) Field of Classification Search
USPC ................... 177/25.15, 145; 705/407
See application file for complete search history.

(56) References Cited

U.S. PATENT DOCUMENTS

| | | | |
|---|---|---|---|
| 3,960,227 A | 6/1976 | Zucker et al. | |
| 4,709,770 A * | 12/1987 | Kohashi et al. | 177/50 |
| 4,956,782 A | 9/1990 | Freeman et al. | |
| 5,230,391 A * | 7/1993 | Murata et al. | 177/50 |
| 5,373,363 A * | 12/1994 | Kobayashi | 356/634 |
| 5,635,679 A * | 6/1997 | Kohashi et al. | 177/25.13 |
| 5,990,422 A * | 11/1999 | Komori et al. | 177/25.11 |
| 6,107,579 A * | 8/2000 | Kinnemann | 177/145 |
| 6,559,391 B2 * | 5/2003 | Huebler et al. | 177/25.15 |
| 6,825,423 B2 * | 11/2004 | Eaton et al. | 177/1 |
| 6,861,592 B2 * | 3/2005 | Gerstenberg et al. | 177/1 |
| 7,141,745 B1 * | 11/2006 | Schoon et al. | 177/25.15 |
| 7,271,352 B2 * | 9/2007 | Rabindran | 177/25.15 |

(Continued)

FOREIGN PATENT DOCUMENTS

| | | |
|---|---|---|
| EP | 0 974 819 | 11/2005 |
| GB | 2 235 656 | 3/1991 |

*Primary Examiner* — Randy W Gibson
(74) *Attorney, Agent, or Firm* — Schiff Hardin LLP

(57) ABSTRACT

A fast, dynamic scale has a weighing unit formed by a weighing cell and a transport mechanism with a first motor to drive the transport mechanism. The transport mechanism) is arranged with the motor on the weighing cell, so the weighing cell is loaded with a preliminary load. A first sensor is located at the beginning of the weighing unit. This first sensor emits a first signal to a control unit to start the weighing process for a cargo piece B. A second sensor emits a second signal to the control unit that thereupon generates a communication that a cargo piece Bn following the cargo piece B can be supplied. A weighing unit with a shortened effective length for the weighing is provided. The shortened length allows the interval between successive cargo pieces to be correspondingly shortened. A switchable extraction device is arranged after the weighing unit in the transport direction. The control unit controls the cargo piece transport by means of a third motor of the extraction device and to control the extraction device depending on the length of the cargo piece and on the termination of the weight determination as a result of the weighing, with the extraction device being switched by an actuator.

10 Claims, 5 Drawing Sheets

(56) References Cited

U.S. PATENT DOCUMENTS

| | | |
|---|---|---|
| 7,279,645 B1 * | 10/2007 | Inglin et al. ............... 177/145 |
| 7,358,450 B2 * | 4/2008 | Hubler et al. ............. 177/25.15 |
| 7,405,368 B2 * | 7/2008 | Beck et al. ............... 177/25.13 |
| 7,601,923 B2 * | 10/2009 | Lyga et al. ............... 177/25.15 |
| 7,858,889 B2 * | 12/2010 | Hahn et al. ............... 177/145 |
| 2007/0050315 A1 | 3/2007 | Rabindran |
| 2009/0008859 A1 | 1/2009 | Fairweather et al. |
| 2009/0139777 A1 | 6/2009 | Lyga et al. |
| 2012/0279787 A1 * | 11/2012 | Huebler et al. ............. 177/145 |

* cited by examiner

DYNAMIC SCALE WITH EXTRACTION DEVICE THAT CAUSES STATIC WEIGHING OF IDENTIFIED ITEMS, AND METHOD FOR THE OPERATION THEREOF

BACKGROUND OF THE INVENTION

1. Field of the Invention

The present invention concerns a fast, dynamic scale and a method to control a fast, dynamic scale that allow rapid weighing of general cargo, for example, mail pieces. The invention is suitable for use in mail processing systems that have an increased throughput.

2. Description of the Prior Art

In mail processing various solutions are known in the field of dynamic weighing. The companies Neopost and Pitney Bowes offer table devices for approximately horizontal transporting systems, wherein the mail pieces are transported lying flat on the back side thereof so that a franking stamp can be applied to the front side of the mail pieces.

From European Patent EP 974 819 B1 a device is known to weigh moving mail goods, in particular to weigh mail pieces (letters) arranged standing on edge. A transport belt driven by a motor runs on track rollers over a weighing plate that is equipped with a guide wall to guide the mail pieces. The guide wall is equipped to guide the mail pieces and is tilted at an angle of 108° relative to the table plate.

The mail pieces—tilted onto their front sides—slide further along the guide wall while the approximately horizontally-arranged transport belt is moved further, on which transport belt the mail pieces are transported, standing on edge. Mail pieces are, for example, post cards, letters in envelopes and other mail goods up to 20 mm in thickness. The throughput in the latter cited system amounts to approximately 50 letters per minute with dynamic weighing of the mail goods. The throughput of a franking machine is determined from the number of letters per time unit and amounts at most to 150 letters per minute. At a given transport speed and a letter separation from the leading letter edge of one enveloped letter to the leading letter edge of the next enveloped letter (edge to edge), the throughput results from the quotient of the transport speed and the letter spacing. The motor, the transport belt with track rollers and the weighing plate with guide wall load a weighing cell. On a weighing cell the weighing plate with the transport belt and the track rollers as well as a first motor are arranged so that the weighing cell is loaded with an initial load (tare weight). A first sensor is arranged at the intake of the weighing unit, this sensor emitting a first signal to a control unit that starts the weighing process for a letter B. Moreover, a second sensor is provided at the outlet of the of the weighing unit, this second sensor emitting a second signal to a control unit which generates a communication that a following letter Bn, which follows the letter B, can be supplied. The aforementioned components form the dynamic scale that is operated together with a franking machine of the Jetmail® type in a franking system from the assignee, which together determine the throughput of mail pieces.

To increase throughput by shortening the interval between the letters, from EP 2017589 A2 (=US 20090008859 A1) a system transporting the letters approximately horizontally is known in which at least two weighing units are arranged in succession. Short letters can be weighed successively with a short interval by means of a first weighing unit because the latter is adapted in terms of its length to the length of the short letters. Given long letters the weighing result is a superposition of the weighing results of both weighing units. The higher cost relative to a system with only a single weighing unit is disadvantageous. The connection of multiple weighing units in series makes a markedly higher computing cost necessary in the calculation of the weight values, which can be time-critical. Slippage/synchronization problems can occur between the weighing units that can lead to impacts that can affect the weighing result.

An additional solution to increase throughput exists in a parallel arrangement of two weighing units is known from EP 2,065,686 A1 (=US 20090139777 A1). The connection of two weighing units in parallel entails the problem of the markedly increased space requirement due to the two units to control the letter flow, a markedly increased control expenditure and higher costs. Moreover, additional devices are necessary to divide and merge the letter flow before and after the scale, which further drives up the space requirement.

A franking system from Francotyp-Postalia GmbH include at least one automatic feed station, a dynamic scale and a franking machine downstream in the mail flow. For the franking machine of the Centormail® type a transport system is used in which mail pieces standing on edge are transported in succession. Given mail pieces such as letters, a letter range of letter lengths from 140 mm to 353 mm can be processed. Letters in the C6 length format thus have a median letter length of 229 mm. Customer requirements for a higher throughput of the franking system with the Centormail® franking machine make it necessary to either increase the transport speed for mail pieces (in particular letters) in a system or to reduce the interval between the letters. However, the length of the weighing unit that is required in practice can only be determined only by testing (experimentation).

SUMMARY OF THE INVENTION

An object of the invention is to reduce the interval between the cargo units to be weighed for a fast, dynamic scale with a weighing unit and at a given transport speed in order to thus increase the throughput of mail pieces—for example in order to double the throughput of letters with medium length—without reducing the length spectrum (range of length of the mail items) to be processed. Moreover, a method should be provided to control such a fast, dynamic scale.

The object is achieved by a dynamic scale according to the invention having a weighing unit with a shortened effective length $L_w$ for the weighing. By shortening the length $L_w$, the interval between successive cargo pieces can be correspondingly shortened. The weighing of longer cargo pieces can thereby take place until these project beyond the weighing unit in the transport direction, wherein the center of gravity of the cargo pieces is still situated on the weighing unit. An activatable extraction device is arranged after the weighing unit in the transport direction, which due to its length and positioning, allows both the shortest and the longest cargo pieces to be drawn from the weighing unit and transported further. A control unit is provided to control the cargo piece transport by means of a motor of the extraction device and to control the extraction device depending on the length of the cargo piece and on the termination of the weight determination as a result of the weighing, and the extraction device is switched by an actuator to switch off and on or to open and close the extraction device.

The actuator transduces an input variable—i.e. an electrical current—into an output variable of a different type—i.e. a switching movement—and with this achieves the desired opening and closing (switching off and on).

The weighing unit that is shortened in terms of its length is arranged at a distance upstream from an automatic feed station that supplies cargo pieces to the dynamic scale. A range (spectrum) of cargo pieces of different lengths can be processed, this range including cargo pieces that have a minimum length $L_{Bmin}$; that is the sum of a first distance that the second sensor is spaced apart from the first sensor at the intake of the weighing unit, and a second distance that the second sensor is spaced apart from the axis of the second track roller at the outlet of the weighing unit. The length of the shortened weighing unit results from the sum of these spacings. A third sensor is arranged at a third distance in the transport direction following the outlet of the weighing unit, directly before the extraction device. A fourth sensor in the extraction device is arranged at a fourth distance (spacing) from the third sensor in the transport direction.

Optionally, downstream of the weighing unit a fifth sensor can be provided in the extraction device at a fifth distance after the fourth sensor. This fifth sensor is connected with the control unit in order to be able to determine (by means of the control unit) whether a cargo piece has been transported a defined distance in the extraction device.

The method to control a fast, dynamic scale in accordance with the invention has the following steps.

weighing process is started by a first sensor S1 at the intake of the weighing unit being enabled by the cargo piece B to be weighed. The end of the weighing process is monitored and the supply of a subsequent cargo piece Bn to the weighing unit is started and the following cargo piece Bn is supplied to the weighing unit when the trailing edge of the previously supplied cargo piece B has reached a minimum trigger position at a second sensor S2 and the weighing process for the cargo piece B has ended.

An extraction device is controlled in order to be switched off so that the cargo piece B can be driven without contact into the extraction device when the leading edge of the cargo piece B reaches a third sensor S3 that is arranged at a distance after the discharge of the weighing unit immediately before the extraction device, The extraction device is further designed so as be activated so that the cargo piece B can be transported through the extraction device when the leading edge of the cargo piece B reaches a minimum activation position at a fourth sensor S4 and the weighing process of the cargo piece B has ended.

Additional steps in the method can include switching over from a dynamic weighing mode to a semi-dynamic weighing mode when the weighing process of the cargo piece B has not yet ended and when the cargo piece B has been transported a defined distance into the extraction device. The dynamic scale, when switched into the semi-automatic weighing mode executes the following steps:

a) switch on the extraction device,
b) stop the transport of the cargo piece into the scale,
c) transport the cargo piece back onto the weighing unit,
d) static weighing of the cargo piece,
e) further control the weighing unit and the extraction device to eject the cargo piece.

A static weighing means weighing of the unmoving, stationary cargo piece.

Mail pieces—for example post cards, letters in envelopes and other postal goods—are encompassed by the term "cargo." When the term "letter" is used for simplification in the exemplary embodiments, this means enveloped letters, but other mail pieces or cargo are not necessarily excluded.

To further control the weighing unit, the following steps can be implemented start the transport of the cargo piece B on the weighing unit in the transport direction, query whether the trailing edge of the cargo piece B has left the region of the second sensor S2 during the transport and, in the event that it has been established that the trailing edge of the cargo piece B has left the region of the second sensor S2, a message is generated and output to the automatic feed station so that a subsequent cargo piece Bn is supplied.

To further control the extraction device to eject the cargo piece, the following steps can be implemented:

query whether the leading letter edge of cargo piece B has reached the sensor S3, switch off the extraction device in such a manner that the cargo piece B can enter into the extraction device without contact, query whether the leading letter edge of the cargo piece B has reached the sensor S4, activate the extraction device, and transport the cargo piece through and out of the extraction device.

A switchable extraction device follows after the shortened weighing unit in the direction of the cargo flow (mail flow). This solution can advantageously be realized in the same structural space (i.e. in the same housing) as that dynamic scale that has been offered since 2006 with the Centormail® franking machine. The invention can be used for dynamic scales, both for those that transport a letter standing on edge and those that transport a letter lying on the flat side. A markedly higher letter throughput is advantageously already achieved even without an increase of the system speed.

DESCRIPTION OF THE PREFERRED EMBODIMENTS

Figures 1, 2:
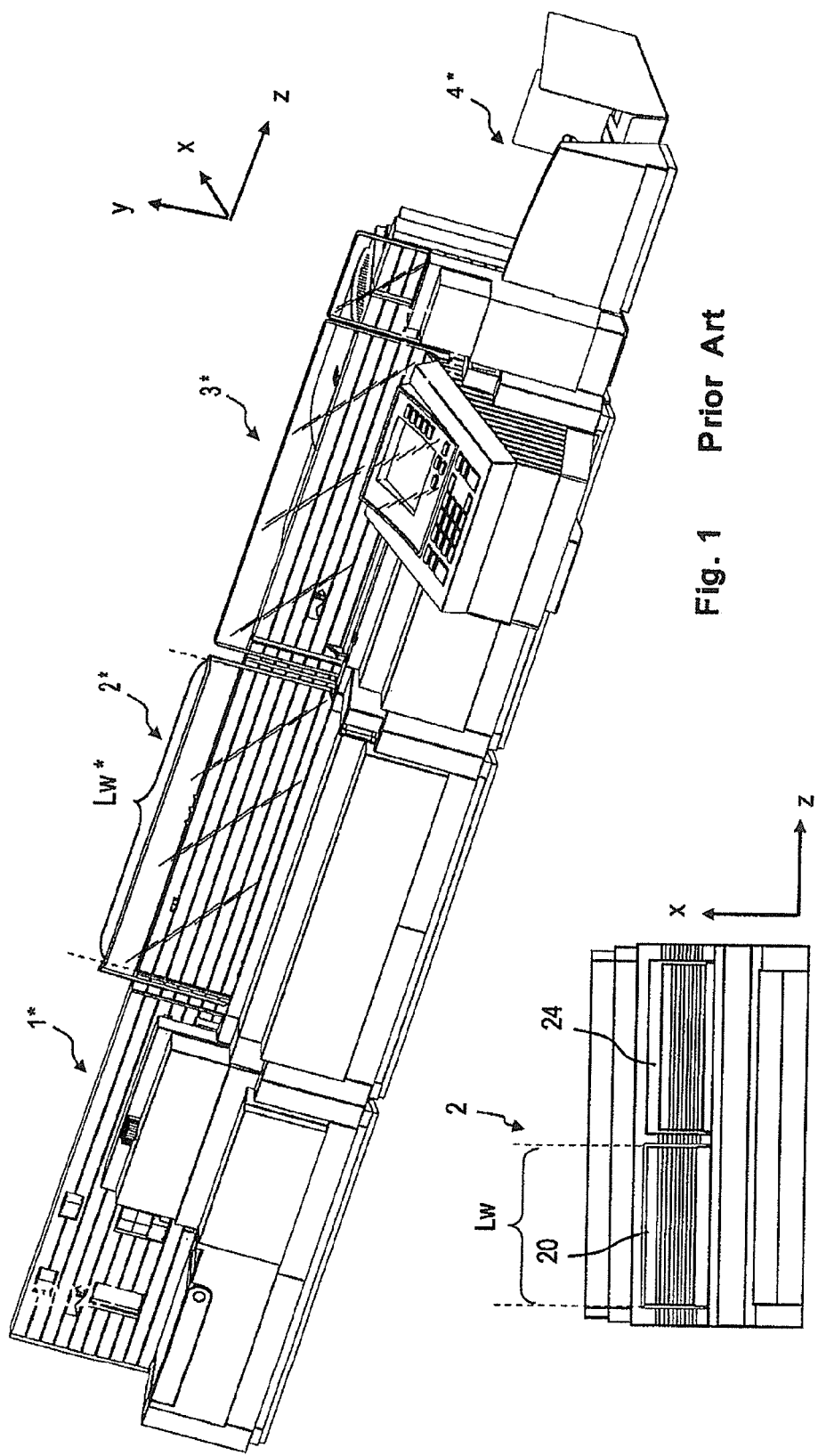
FIG. 1 is a perspective view of a known franking system with a dynamic scale, as seen from the front, above and to the right.
FIG. 2 is a plan view of a fast, dynamic scale (x/z-plane).

In FIG. 1 a perspective representation of a known franking system with a dynamic scale is shown from the front, above and to the right. For example, the franking system stands on a table (not shown) whose table plate is situated parallel to an x/z-plane of a Cartesian coordinate system. This franking system from Francotyp-Postalia GmbH includes an automatic feed station 1*, a dynamic scale 2*, a franking machine 3* and a tray 4* downstream in direction of the mail flow. The width of the fast, dynamic scale in the x-direction can be minimized because the mail pieces are transported standing on edge in the transport direction z. The width of the weighing unit amounts to 315 mm in the x-direction. To weigh mail pieces at a high transport speed, a weighing plate is required whose horizontal length Lw* is at least equal to the sum of the length that the mail piece to be weighed exhibits as maximum length in the transport direction and that length Ls that results from the product of the transport speed and the measurement time for the longest letter. The maximum length of the weighing unit is limited by the structural length of the dynamic scale in the transport direction z. The length Lw* of the weighing unit could therefore have a minimum length of 353 mm+Ls but amounts to 540 mm because the structural length of the first three stations 1*, 2* and 3* of the franking system is the same and amounts to 550 mm.

FIG. 2 shows a plan view of a fast, dynamic scale in accordance with the invention. The components of the fast, dynamic scale 2 are a weighing unit 20 and an extraction device arranged following this in the mail flow. The length Lw of the weighing unit of the fast, dynamic scale 2 in the transport direction z is in a range from 300 mm to 380 mm. Its maximum length is limited by the structural length of the extraction device 24 in the transport direction z, which is also arranged within the fast, dynamic scale. Given a structural length of the fast, dynamic scale in the transport direction z of L=550 mm, the structural length of the extraction device 24 in the transport direction z is in a range from 170 mm to 250 mm. The solution can advantageously be realized in the same structural space (i.e. in the same housing) as the dynamic scale that has been commercially available since 2006 for a franking system with the Centormail® franking machine.

Figure 3:
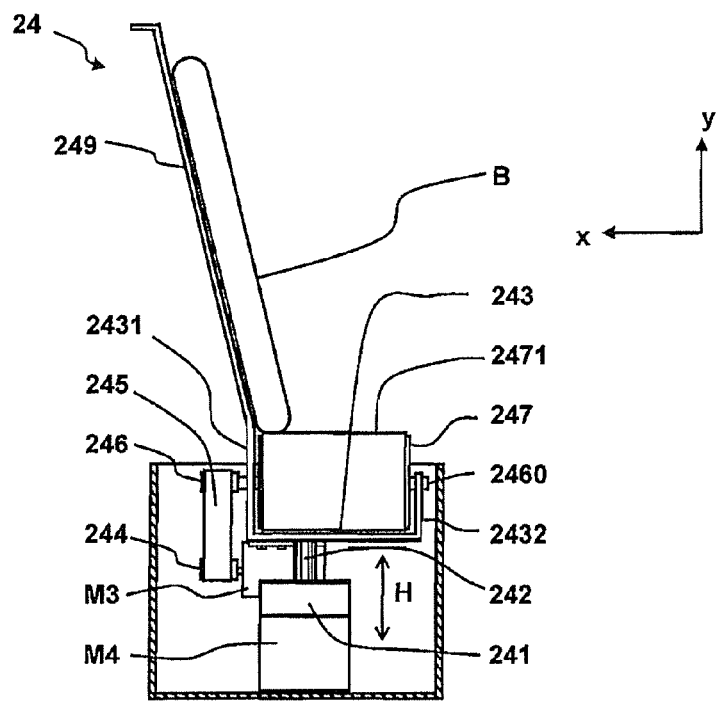
FIG. 3 shows a section through an extraction device according to a first embodiment of the invention, wherein the extraction device is sectioned in the state in which it is pivoted away and parallel to the x/y-plane.

FIG. 3 shows a section through an extraction device according to a first embodiment variant, wherein the extraction device is drawn in the state in which it is pivoted away and is sectioned parallel to the x/y-plane. The switchable extraction device 24 is arranged downstream in the mail flow, directly after the shortened weighing unit, which extraction device 24 (controllable by a control unit, not shown in FIG. 3) can be pivoted away from a letter and back to the letter and in addition to this is fashioned to transport said letter further downstream in the mail flow.

The extraction device according to FIG. 3 has a mount for a switchable transport mechanism. The mount 243 has angle pieces 2431 and 2432 (molded in u-shapes) with holes for a shaft 2460 of a track roller 247 on which runs a transport belt 2471. A motor M 3 is attached to the base of the mount 243, on whose rotatable drive shaft is attached a first roller-shaped belt wheel 244. A second roller-shaped belt wheel 246 is attached to the shaft 2460. The belt wheels are mounted such that they can rotate and are coupled via a drive.

The extraction device 24 has a guide wall 249 that is molded on the angle piece 2431 of the mount 243, near the back side of the fast, dynamic scale. The back side of a letter B rests on the guide wall 249, which letter B is transported standing on its edge on the transport belt 2471 when the motor M3 is activated accordingly. The extraction device 24 can be switched into two states by an actuator via a control unit (not shown). For example, the actuator consists of a motor M4 with an installed transmission (gearing) 241 which converts the rotation movement of the motor shaft into a lifting (stroke) movement H. The latter is transferred by a lifting rod 242 to the floor of the mount.

Figure 4:
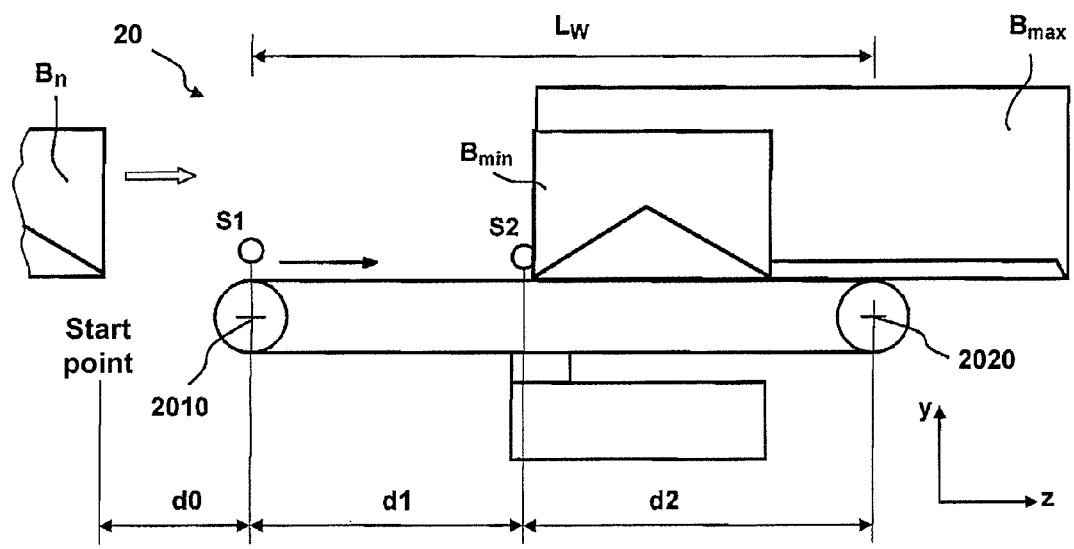
FIG. 4 shows the weighing unit of the fast, dynamic scale in side view (y/z-plane).

FIG. 4 shows a principle representation of the weighing unit of the fast, dynamic scale in a side view (y/z-plane). Two letters are therefore shown standing together on a transport belt of a shortened weighing unit 20, but only to explain the effects of the letter length differences on the dynamic weighing. Only for the first letter Bmin with the minimum letter length is it ensured that it resides entirely on the shortened weighing unit 20 during the dynamic weighing. Although the first letter Bmin is still standing securely on the transport belt when the dynamic weighing has ended, the second letter Bmax (which has a maximum letter length) already extends beyond the transport belt before the dynamic weighing has ended. In the operation of the fast, dynamic scale, however, naturally only one letter at a time stands on the weighing unit 20 so that the weighing result is not adulterated.

The shortened weighing unit 20 has two track rollers for the transport belt and has an effective length Lw (for example Lw=330 mm) for the weighing between the axles 2010 and 2020 of the two track rollers. A first sensor S1 is arranged above the first axle of the first track roller in the y-direction and has a distance d0 from a start point, or from the leading edge of a following letter Bn. A second sensor S2 is arranged above the transport belt in the y-direction and has a first distance d1 from the first sensor S1 in the transport direction z and a second distance d2 (likewise situated in the transport direction z) from the second sensor S2 up to the end of the length Lw of the weighing unit that is effective for the weighing. Given a further transport in the transport direction z, the letter with the maximum letter length Bmax that already projects beyond the transport belt would tip due to the force of gravity. Therefore, in the transport direction z of the mail flow a switchable extraction device follows the single shortened weighing unit, the design of which extraction device was already explained according to a first variant using FIG. 3.

The first sensor S1 at the intake of the weighing unit 20 emits a signal to start the weighing process when the letter B1 to be weighed clears the sensor S1. Given a transmitted light sensor used as sensor S1, this is the case when the light beam is no longer interrupted by the letter, i.e. when the trailing edge of the letter has moved beyond the position of the sensor S1 behind. The position of a second sensor S2 lies downstream (in terms of the mail flow) of the position of the first sensor S1. The second sensor S2 is arranged at a first distance d1 from the first sensor S2 and at a second distance d2 from the outlet of the weighing unit. The first distance d1 is dimensioned such that, at a specific transport speed of the automatic feed station, the leading letter edge of a subsequent, additional letter Bn only reaches the weighing unit only when the first letter Bmin has already left the weighing unit.

The following relations exist:

$$d1 = Lw - d2 \quad (1)$$

and $$d2 = d0 + L_{Bmin} \quad (2)$$

For example, at the system speed $v_S$=680 mm/s the weighing unit has a length Lw=330 mm, the shortest letter has the length $L_{Bmin}$=140 mm and the distance from the start point of the following letter amounts to d0=48 mm. Therefore d1=142 mm results for the first distance and d2=188 mm results for the second distance.

The length of the weighing unit can vary in a range Lw=300 mm to 380 mm. Given a higher system speed, the length of the weighing unit is also increased, so the ratio d1/d2 remains approximately the same.

The automatic feed station and the dynamic scale are executed as what are known as intelligent peripheral apparatuses for the franking machine, meaning that these peripheral apparatuses each has its own control unit and interfaces via which the automatic feed station and the dynamic scale communicate with one another in the franking system. Measurement value data and sensor signals that are determined in the automatic feed station can be communicated to the dynamic scale via the interfaces, and similarly in reverse one of the sensor signals can also be communicated from the dynamic scale to the automatic feed station. The control unit of the dynamic scale generates a corresponding communication.

Based on such a communication of data and signals, the automatic feed station starts the letter feed of the following letter Bn when the weighing process for the first letter Bmin or second letter Bmax has ended and when the first letter Bmin or second letter Bmax also clears the second sensor S2, meaning that the trailing edge of the first letter Bmin or second letter Bmax has passed beyond the position of the second sensor S2. A markedly shorter letter interval—and thus a markedly higher letter throughput—can be achieved due to the shortened length $L_W$ of the weighing unit in combination with the described workflow control, without an increase of the system speed.

Figure 5:
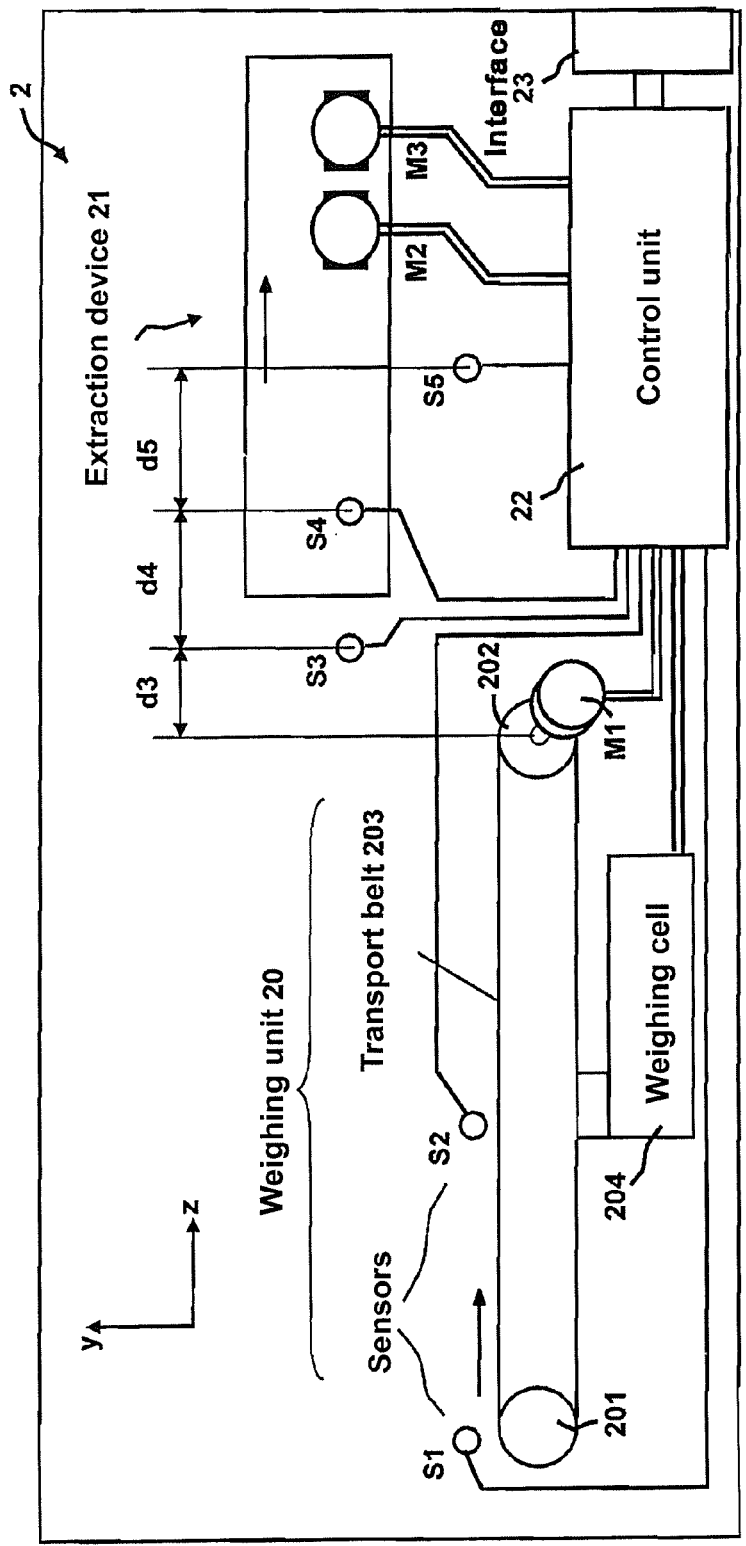
FIG. 5 shows the fast, dynamic scale in side view (y/z-plane), with a weighing unit, with an extraction device according to a second embodiment of the invention and with additional components.

A principle representation of the fast, dynamic scale 2 in side view (y/z-plane), with a weighing unit, with an extraction device according to a second embodiment variant and with additional components, is shown in FIG. 5. The weighing unit 20 again has first and second rollers 201, 202 for a transport belt 203, wherein the second roller 202 is driven by a first motor. The components 201 through 203 are arranged on weighing cell 204 and load this with a weight. The first sensor is arranged above the axle of the first roller 201 in the transport direction z and the second sensor S2 is arranged above the transport belt 203 in the transport direction z at a distance that corresponds to at least a length $L_{Bmin}$ of the shortest letter plus a safety margin that grows with system speed.

The sensors S1, S2 and the first motor M1 as well as the weighing cell 204 are connected in terms of measurement and control with a control unit 22, for example electrically connected via corresponding conductors.

Downstream (in terms of the mail flow), a switchable extraction device 21 according to the second embodiment variant is arranged immediately after the shortened weighing unit, which extraction device 21 is fashioned so that it can be controlled by the control unit to open and close and grips the letter on the flat side, and is fashioned in order to transport said letter further. The transport direction z is indicated by an arrow. A third sensor S3 is arranged at a third distance after the outlet of the weighing unit, immediately before the extraction device, and that a fourth sensor S4 is arranged in the extraction device at a fourth distance from the third sensor. The third sensor S3 is arranged at a third distance d3=0 to 50 mm from the axle of the second track roller at the outlet of the weighing unit, and the fourth sensor as arranged at a fourth distance d4=20 to 80 mm from the third sensor S3.

The additional sensors S3, S4 (and possibly S5) and additional motors M2, M3 and an I/O interface 23 for input and output of data are likewise connected in terms of measurement and control (as well as communication) with the control unit 22. Signals to control the motors M2 and M3 of the controllable extraction device 21 are transmitted to the control unit 22 by the third sensor S3 and fourth sensor S4, possibly additionally by a fifth sensor S5. The sensor S3 signals when the leading letter edge reaches a deactivation position of the extraction device. The sensor S4 signals whether a minimum activation position of the extraction device has been reached by the leading letter edge.

The control unit of the dynamic scale on the one hand controls the weighing unit and on the other hand controls an activatable extraction device which achieves the object of removing or collecting a just-weighed letter from the weighing plate and relaying it to the franking machine.

The control of the extraction device takes place according to the following method:
i) Detect the leading letter edge of a letter and prepare the collection, wherein the extraction device is opened or, respectively, switched off so that the letter can enter without contact into the extraction device when the leading letter edge of the letter reaches the third sensor S3, which is arranged directly before the extraction device.
ii) Close or, respectively, activate the extraction device under the following conditions:
  a) the weighing process for the letter has ended and
  b) the leading edge of the letter has reached the fourth sensor S4, i.e. has reached a minimum activation position of the extraction device.

The workflow described above concerns a letter with short, medium or long letter length. The control unit 22 prepares the collection via a corresponding activation of the motors M2 or, respectively, M4 (variant according to FIG. 3). The motor M2 effects the opening and the motor M4 effects the deactivation of the extraction device. The control unit controls the closing or activation of the extraction device upon the occurrence of the aforementioned conditions so that the motor M2 effects the closing, or the motor M4 effects the activation of the extraction device. The motor M3 effects the letter transport in the extraction device, in a direction determined by the control unit 22.

If the weighing process of a longer letter has not yet ended and its leading edge has already reached the fourth sensor S4 (i.e. the minimum activation position of the extraction device), a querying of a letter length information that was previously determined or a querying of a fifth sensor S5 is moreover necessary. The fifth sensor S5 is arranged at the extraction device at a fifth distance from the fourth sensor in the transport direction z. Alternatively, a length information for the letter can be predetermined or set by means of a corresponding measurement or adjustment device; for example, for this a length measurement from the automatic feed station can be used in order to be able to determine computationally how far the letter B has been transported into the extraction device.

In both embodiment variants a switch from the mode for dynamic weighing to a mode for a semi-dynamic weighing then takes place if a corresponding item of information is present from which an excess length arises, or if a signal of the fifth sensor S5 signals an initial tipping of the letter. The incompletely weighed letter is driven back onto the weighing plate and the measurement is determined via semi-dynamic weighing. Naturally, lower throughputs are achieved in a weighing characterized by a semi-dynamic weighing than given a purely dynamic weighing.

Otherwise, even given long letters a dynamic weighing can still lead to a result promptly, i.e. before the letter tips. The weight and the center of gravity of the letter have a decisive influence on whether a plausible measurement result exists in a timely manner. The length of the weighing plate was therefore also determined empirically.

Figure 6A:
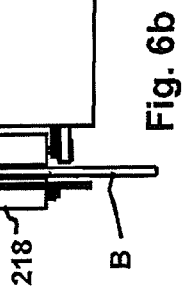
FIGS. 6a and 6b show the extraction device according to the second embodiment variant, in the opened state and in the closed state with a view from the left on the x/y-plane.
Figure 6B:
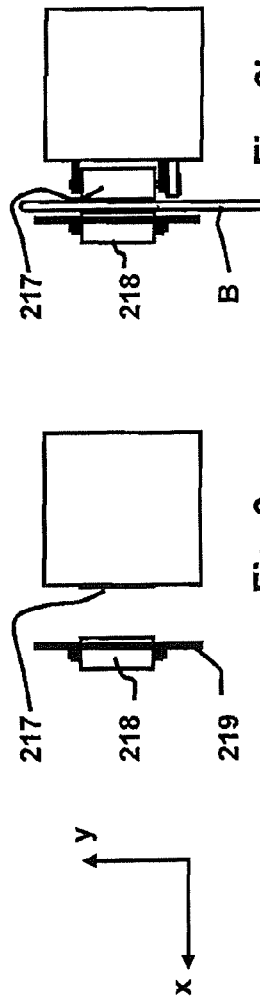

The mechanical function of the extraction device 21 according to the second embodiment variant is discussed in detail in FIGS. 6a and 6b.

FIGS. 6a and 6b show a section representation through an extraction device 21 according to the second embodiment variant, wherein the section runs parallel to the x/y-plane. FIG. 6a shows an extraction device with opened extraction roller pair 217, 218. For example, the roller 218 is arranged at a guide wall 219 and the roller 217 is arranged in the housing of the extraction device 21 such that the roller 217 can be switched.

FIG. 6b shows a representation of the extraction device according to the second embodiment variant, with closed extraction roller pair 217, 218. Both extraction rollers 217, 218 form a clamp to hold a letter B and transport this further in the transport direction.

Figure 6C:
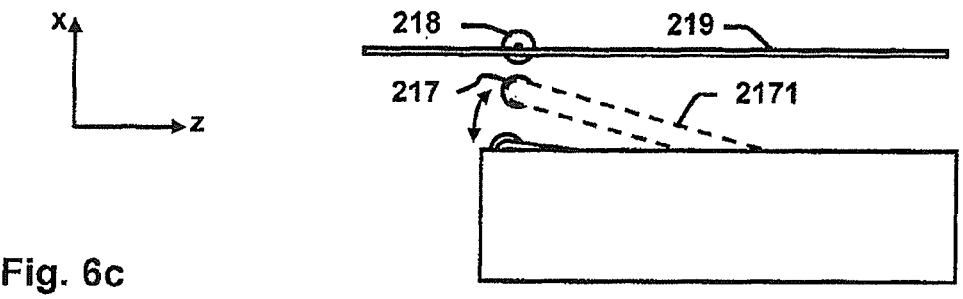
FIG. 6c is a view of the extraction device from above on the x/z plane.

A view of the extraction device from above on the x/z-plane, in the opened or, respectively, closed state (drawn with dashed line) is shown in FIG. 6C. The extraction roller 218 is arranged at the guide wall 219 and the extraction roller 217 is arranged in the housing of the extraction device 21 such that said extraction roller 217 can be switched.

At least one of the extraction rollers is arranged on an arm that can perform a pivot movement around an axle that is arranged downstream in the travel of the letter. An arm 2171 in the closed state is driven out or, respectively, pivoted forwards and, for example, possesses a driven extraction roller 217. The extraction roller 217 is arranged at the end of an arm 2171 that can be pivoted. The arm 2171 pivoted onto the extraction roller 218 is depicted with a dashed line.

Alternatively, each of the two extraction rollers can be arranged on a respective pivotable arms and each can have a mechanism that enables them to execute a lifting motion.

Figure 7A:
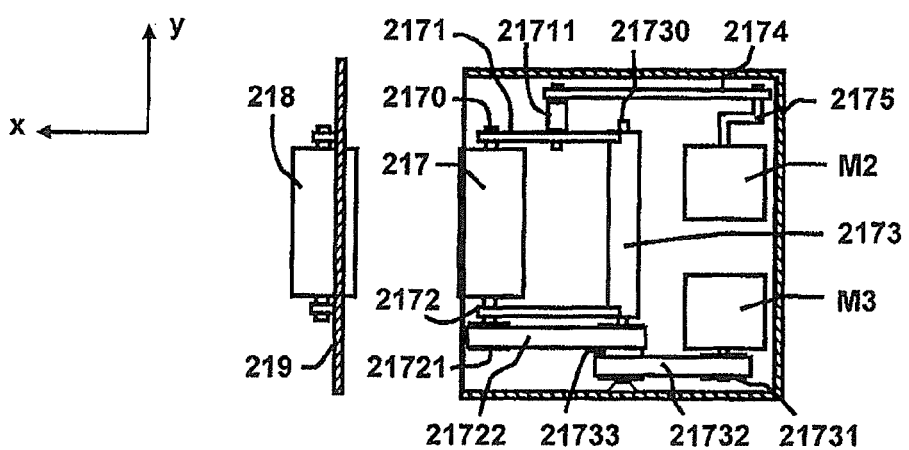
FIGS. 7a and 7b show a section through the extraction device according to the second embodiment, wherein the extraction device is in the opened state on one side and in the closed state on the other side state, and is sectioned parallel to the x/y-plane.
Figure 7B:
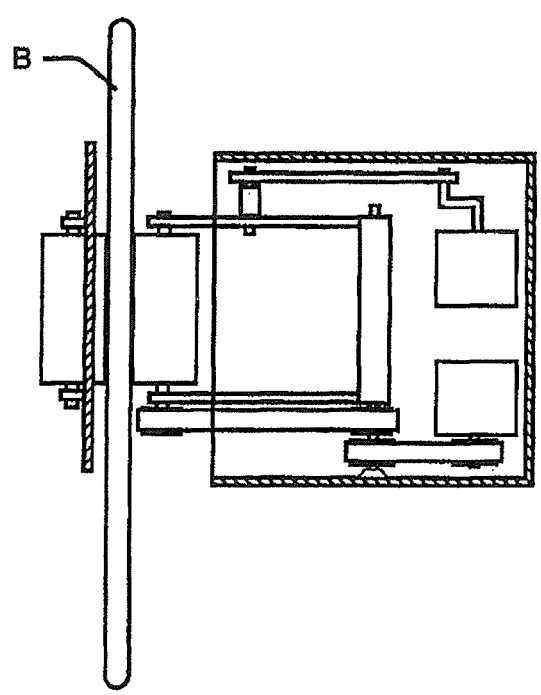

A section representation through the extraction device according to the second embodiment variant is shown in FIGS. 7a and 7b, wherein the extraction device is shown sectioned parallel to the x/y-plane. The extraction roller 218 is not driven and is arranged such that it can rotate at the guide wall 219. The extraction roller 217, which is borne such that it can rotate, situated opposite the undriven extraction roller 218, is driven and can be moved towards and away from the undriven extraction roller 218 by means of a mechanism. The extraction rollers 217 and 218 form a roller pair with a nip in the x/y-plane. The driven roller 217, which can be activated, is arranged on a rotatable shaft 2170 between two arms 2171, 2172. The shaft 2170 is arranged at the free ends of the arms, the other ends of which are formed to a base body 2173 that is borne such that it can pivot around a shaft 21730, wherein the shaft 21730 is attached in the housing the extraction device 21. The pivoting of the arms 2171, 2172 is generated by a second motor M2 and a desired rotation direction of the driven extraction roller 217 is generated by a third motor M3, wherein the motors M2 and M3 are activated via the control unit (not shown). The motor shaft of the second motor M2 is firmly connected with a crank 2175. A first end of a connecting rod 2174 is mounted on the free end of the crank 2175 such that said first end of said connecting rod 2174 can revolve; the second end of said connecting rod 2174 acts on an elastic part 21711 which is coupled with the one arm 2171 in order to pivot the latter if the crank is turned.

A first driven roller 21721 that is driven via a first belt 21722 is attached at the end of the shaft 2170 which lies near the other arm 2172. The first belt 21722 is laid over a second roller 21733 that is arranged borne on the shaft 21730 such that said second roller 21733 can rotate. A first drive roller 21731 over which a second belt 21732 runs is attached to a motor shaft of a third motor M3. The second belt 21732 likewise runs over the second roller 21733 and sets the latter into a rotation as needed and drives this, and thus drives the extraction roller 217 of the extraction device. The extraction device is shown in the opened state in FIG. 7a.

In FIG. 7b the extraction device is drawn in the closed state. The undriven extraction roller 218 and the driven extraction 217 that is pivoted onto it form a clamp roller pair between which a letter B is clamped. The letter B can be transported forward in the direction z of the mail flow by the roller pair and can also be transported back as needed.

Alternatively, in a further embodiment variant the extraction roller 218 can be driven and the extraction roller 217 that is pivoted onto it can be undriven.

Alternatively, in a further embodiment variant both extraction rollers 217 and 218 are driven in order to transport a letter.

Alternatively, the extraction roller 218 can be arranged at the guide wall 219 such that said extraction roller 218 can be switched, and the extraction roller 217 in the housing of the extraction device 21 is not switchable but is driven.

Alternatively, the extraction roller 218 is arranged at the guide wall 219 such that said extraction roller 218 can be switched and is driven. The extraction roller 217 in the housing of the extraction device 21 is neither switchable nor driven.

Alternatively, in a further embodiment variant both extraction rollers 217 and 218 are pivoted and at least one is driven.

Alternatively, in a further embodiment variant both extraction rollers 217 and 218 are replaced by conveyor belts or suitable means in order to transport a letter.

Figure 8:
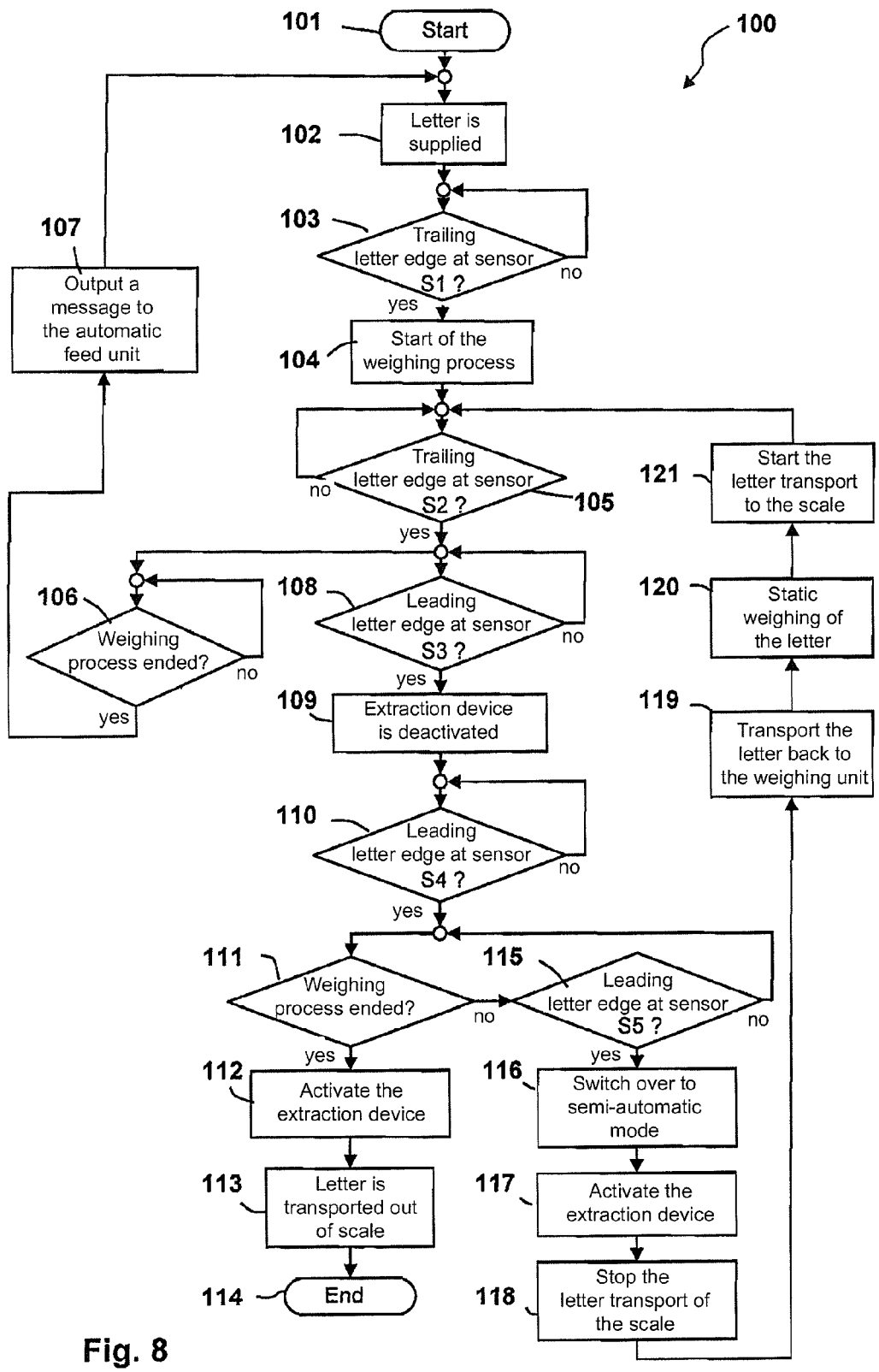
FIG. 8 is a flowchart of an embodiment of the method in accordance with the invention for operating a fast, dynamic scale.

Using FIG. 8, a workflow plan 100 is explained for the operation of the fast, dynamic scale. After the start of the franking system in a first Step 101, a second Step 102 follows in which a letter B (coming from the automatic feed station) is supplied to the dynamic scale and is then transported further in the transport direction. In the subsequent query step 103 the first sensor 51 is polled by the control unit of the dynamic scale in order to establish whether the trailing edge of the letter has left the region of the first sensor 51 during the transport. Otherwise, if this does not occur the workflow branches back to the beginning of the query step 103.

After the start of the weighing process in Step 104 an additional query step 105 is reached in which the second sensor S2 is polled by the control unit in order to establish whether the trailing edge of the letter B has left the region of the second sensor S2 during the transport. If this applies, a following query step 106 is reached in which the control unit queries whether the weighing process has ended. In this case, if it is established that the weighing process has been ended, a message is generated in Step 107 and is emitted as an automatic feed station.

After Step 107 the workflow branches back to the beginning of the second Step 102 and a subsequent letter Bn can be supplied to the weighing unit since the weighing process for the letter B has ended. In the meanwhile the letter B is transported further to the extraction device. The query in the query step 106 is repeated, and as long as it is not the case that the weighing process has ended, the workflow branches back to the beginning of the query step 106. Naturally, during the query the letter is nevertheless transported further and with its leading edge reaches the third sensor S3 at the entrance of the extraction device. Therefore, via an additional query step 108 an additional query is required as to whether the leading edge of the letter B has reached the region of the third sensor S3 during the transport. If this applies, a following Step 109 is reached in which the extraction device is switched off and the extraction roller pair is opened. In a further query step 110 it is subsequently queried whether the leading edge of the letter B has reached the region of the fourth sensor S4 during the transport. If this applies, a subsequent query step 111 is reached in which it is queried whether the weighing process has ended. If this applies, a following Step 112 is reached in which the extraction device is activated and the extraction roller pair is closed in order to transport the letter B further. In a subsequent Step 113 the letter B is transported out of the scale to the franking machine and the workflow is ended in Step 114.

However, it is established in query step 111 that the weighing process has not yet ended, an additional query is implemented in query step 115. For example, a fifth sensor S5 can be used in order to establish whether the leading edge of the letter B has reached the region of the fifth sensor S5 during the transport, or whether the letter B has already tipped due to the effect of gravity.

Alternatively, given a known length of the letter how far the letter B has already been transported can be established even without an additional sensor. An alternative query is then implemented in query step 115.

If the leading edge of the letter B reaches the region of the fifth sensor S5, the letter B has then already been transported far enough and a switch over to a semi-dynamic mode is implemented in Step 116. Otherwise the workflow branches back to the beginning of the query step 111.

After switching over to a semi-dynamic mode in Step 116, an activation of the extraction device takes place in Step 117 and a stopping of the letter transport in the dynamic scale takes place in Step 118 before Step 119 is reached, in which a reverse transport of the letter B from the extraction device to the weighing unit of the fast, dynamic scale takes place. The first motor M1 of the weighing unit and the second motor M2 or, respectively, third motor M3 of the extraction device are controlled accordingly in order to reverse the transport direction. If the letter is placed centrally on the weighing unit, a static weighing of the letter is implemented in Step 120. A weight value now exists as a weighing result.

In Step 121 the letter is subsequently transported in the transport direction z again and the beginning of the query step 108 is reached again. The Steps 109 and 110 are executed again before it is established in query step 111 that the weighing process for the letter B has already been ended. Steps 112 and 113 are run through and the letter B leaves the extraction device at the output side of the mail flow. The end of the workflow is reached in Step 114.

The extraction device can be operated in a dynamic weighing mode and in a semi-dynamic weighing mode, wherein the switch over from dynamic to semi-dynamic weighing mode takes place automatically.

Moreover, the weighing unit and extraction device can be switched over into a mode without weighing and are thereby controlled as follows:

Feed and transport of the letter B onto the weighing unit in the transport direction (as in Step 102), query whether the trailing edge of the letter B has left the region of the second sensor S2 during the transport (as in query step 105) and, in the event that it is established that the trailing edge of the letter B has left the region of the second sensor S2, a message is generated and output to the automatic feed station (as in Step 107) so that a following letter Bn is supplied (as in Step 102), query whether the leading letter edge of the letter B has reached the sensor S3 (as in query step 108), deactivate the extraction device in such a manner that the letter B can enter into the extraction device without contact (as in Step 109), query whether the leading letter edge of the letter B has reached the sensor S4 (as in query step 110), activate the extraction device (as in Step 112) and transport the letter through and out of the extraction device and (as in Step 113).

An end of the weighing process does not need to be considered; the semi-automatic reweighing is also accordingly omitted.

In the preferred solution variant, the achievement of the object assumes that the transport speed v for mail pieces of the fast, dynamic scale is advantageously equal to the system speed. The advantage therefore results that the separation certainty of the automatic feed station (feeder)—which is arranged preceding the fast, dynamic scale in the mail flow—continues to be provided. Components that are matched to and supported by the present system speed, such as motors and transmissions of specific capacities and service life, are contained in the automatic feed station, the fast, dynamic scale and a franking machine (that is downstream in the mail path).

However, additional solution variants with higher system speed that can additionally increase the throughput should not be precluded by this. The aforementioned components would merely have to be correspondingly adapted if the system speed were to be increased.

If the system speed for a franking system should be increased, the limitations in the calculation speed—in particular the billing time for franking imprints in the dynamic weighing mode—are likewise to be taken into account.

The length for a shortened weighing unit results only imprecisely from theoretical considerations, for instance by addition of a first letter length and a second length that results from the product of the transport speed and the measurement time for the longest letter. However, the length of the shortened weighing unit that is necessary in practice (i.e., in actual operation) can be determined only through tests because the distance of the leading letter edge of the following letter Bn from the weighing unit, and a constant length $L_{const}$ based on time delays due to reaction times of the franking system based on the processing times of software messages and the times for acceleration distances, form a sum that is the actual letter separation in practice.

The extraction device can be designed differently from the embodiment variants that have been described above. The extraction device according to the embodiment variant (FIG. 3) can also simply be adapted to those dynamic scales which transport letters lying on the flat side in a horizontal direction.

Although the invention has been described in the context of a franking system for mail pieces, it can be used for implementing weighing in applications other than a franking system. Different length relationships between the weighing unit and the extraction device are possible as needed, and given a modified system speed. Even if the length spectrum from 140 mm to 353 mm were to be maintained, the length of the weighing unit that is effective for the weighing would turn out to be greater given an increased system speed and given a measurement time remaining the same for the determination of the weight, and conversely would turn out to be smaller given a reduced system speed.

The weighing unit and the extraction device can be heated in separate housings, adapted to the dimensions of cargo pieces.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for operating a dynamic scale, comprising:
automatically moving successive cargo pieces on a transport mechanism without stoppage onto a weighing cell of a weighing unit in a transport direction, said cargo pieces exhibiting respective lengths along said transport direction in a range between a shortest length and a longest length;

from a first sensor located at a beginning of said weighing unit, emitting a first sensor signal upon being passed by one of said cargo pieces in said transport direction;

from a second sensor located in said weighing unit following said first sensor in said transport direction, emitting a second sensor signal indicating that a next-successive cargo piece, immediately following said one of said cargo pieces, can be supplied to said weighing unit;

from a computerized control unit, operating said weighing cell to implement an individual dynamic weighing procedure for each of said cargo pieces without stoppage of the respective cargo pieces on said weighing cell;

providing said control unit with said first sensor signal and, upon receiving said first sensor signal, said control unit starting said individual dynamic weighing procedure for said one of said cargo pieces that has passed the first sensor;

said weighing unit having an effective length in said transport direction that reduces an interval between successive ones of said cargo pieces to be weighed, said effective length being less than said longest length and thereby resulting in some of said cargo pieces being unable to be weighed without stoppage on said weighing cell in said dynamic weighing procedure;

from a third sensor located at a distance in said transport direction following an outlet of said weighing unit, emitting a third sensor signal when a leading edge of a cargo piece passes said third sensor;

supplying said control unit with said second sensor signal and said third sensor signal and, from said second sensor signal and said third sensor signal, said control unit detecting a cargo piece, as a detected cargo piece, that due to the length of said detected cargo piece, has reached said third sensor without said second sensor signal being emitted, thereby indicating that said detected cargo piece has not been able to be dynamically weighed on said weighing cell;

in an extraction device following said weighing unit and said third sensor in said transport direction, providing an extraction mechanism operated by an extraction device motor and an actuator for actuating said extraction mechanism via said extraction device motor, said extraction device mechanism being normally unactuated to allow free movement of said cargo pieces through said extraction device by operation of said transport mechanism, and said actuator, when actuated, operating said extraction mechanism to engage and hold a cargo piece; and placing said control unit in communication with said actuator and, upon detecting said detected cargo piece, actuating said actuator from said control device to cause said detected cargo piece to be engaged and held by said extraction device while, from said control unit, operating said weighing unit to statically weigh the engaged and held identified cargo piece, and thereafter, from said control unit, de-actuating said actuator to release said identified cargo piece and then further transporting, the released identified piece through said extraction device by operation of said transport mechanism.

2. A dynamic scale comprising:

a weighing unit comprising a weighing cell and a transport mechanism operated by a transport mechanism motor to move said transport mechanism in a transport direction to move successive cargo pieces on said transport mechanism without stoppage onto said weighing cell in said transport direction, said cargo pieces exhibiting respective lengths along said transport direction in a range between a shortest length and a longest length;

a first sensor located at a beginning of said weighing unit, said first sensor emitting a first sensor signal upon being passed by one of said cargo pieces in said transport direction;

a second sensor located in said weighing unit following said first sensor in said transport direction, said second sensor emitting a second sensor signal indicating that a next-successive cargo piece, immediately following said one of said cargo pieces, can be supplied to said weighing unit;

a computerized control unit configured to operate said weighing cell to implement an individual dynamic weighing procedure for each of said cargo pieces without stoppage of the respective cargo pieces on said weighing cell;

said control unit being in communication with said first sensor and, upon receiving said first sensor signal therefrom, said control unit being configured to start said individual dynamic weighing procedure for said one of said cargo pieces that has passed the first sensor;

said weighing unit having an effective length in said transport direction that reduces an interval between successive ones of said cargo pieces to be weighed, said effective length being less than said longest length and thereby resulting in some of said cargo pieces being unable to be weighed without stoppage on said weighing cell in said dynamic weighing procedure;

a third sensor located at a distance in said transport direction following an outlet of said weighing unit, said third sensor emitting a third sensor signal when a leading edge of a cargo piece passes said third sensor;

said control unit being in communication with said second sensor and said third sensor and, from said second sensor signal and said third sensor signal, said control unit being configured to detect a cargo piece, as a detected cargo piece, that due to the length of said detected cargo piece, has reached said third sensor without said second sensor signal being emitted, thereby indicating that said detected cargo piece has not been able to be weighed on said weighing cell in said dynamic weighing procedure;

an extraction device following said weighing unit and said third sensor in said transport direction, said extraction device comprising an extraction mechanism operated by an extraction device motor, and an actuator for said extraction device mechanism via said extraction device motor, said extraction device mechanism being normally unactuated by said actuator to allow free movement of said cargo pieces through said extraction device by operation of said transport mechanism, and said actuator, when actuated, operating said extraction mechanism to engage and hold a cargo piece; and said control unit being in communication with said actuator and, upon detecting said detected cargo piece, said control device being configured to actuate said actuator to cause said detected cargo piece to be engaged and held by said extraction device while said control unit operates said weighing unit to statically weigh the engaged and held detected cargo piece, and to thereafter de-actuate said actuator to release said detected cargo piece, the released detected piece then being further transported through said extraction device by operation of said transport mechanism.

3. A dynamic scale as claimed in claim 2 comprising a housing having a predetermined dimension in said transport direction, and wherein said extraction device has a length allowing said extraction device to be contained in said housing downstream of said weighing unit in said housing.

4. A dynamic scale as claimed in claim 2 wherein said cargo pieces are flat cargo pieces and wherein said transport mechanism is configured to move said flat cargo pieces in a substantially upright position on said transport mechanism, and wherein said extraction mechanism comprises grips that are positioned to engage opposite sides of the flat cargo pieces, and wherein said actuator comprises an actuator motor, and wherein said control unit is configured to actuate said actuator by operating said actuator motor to cause said grips in said extraction mechanism to grip said cargo piece after completion of the weighing procedure therefor.

5. A dynamic scale as claimed in claim 2 wherein said extraction device is mounted to be operable by said control unit to pivot away from and toward said cargo piece.

6. A dynamic scale as claimed in claim 2 wherein said cargo piece is a mail item.

7. A dynamic scale as claimed in claim 6 comprising an automatic feed station located upstream in said transport direction at a distance d0 from said weighing unit, said feed station supplying mail pieces successively to said weighing unit, and wherein said shortest length of a mail item as a cargo piece is LBmin, and wherein said second sensor is located distance d1 downstream from a beginning of said weighing unit, and wherein said transport mechanism comprises a track running on first and second track rollers, with said second track roller located at an outlet of said weighing unit, with said second sensor being spaced from an axel of said second track roller at a distance d2, and wherein said weighing unit has a length Lw, and wherein $$d1 = Lw - d2$$

and $$d2 = d0 + LBmin,$$

and wherein d0=48 mm, LBmin=140 mm and Lw=300 to 360 mm.

8. A dynamic scale as claimed in claim 7 wherein said third sensor is located at distance d3 in said transport direction following said outlet of said weighing unit and before said extraction device, and a fourth sensor in said extraction unit located at a distance d4 in said transport direction from said third sensor, each of said third and fourth sensors being in communication with said control unit and providing a signal to said control unit upon passage of a mail item by the respective third and fourth sensors, and wherein said d3=0 to 50 mm and wherein d4=20 to 80 mm.

9. A dynamic scale as claimed in claim 8 comprising a fifth sensor located a distance downstream from said fourth sensor, said fifth sensor being in communication with said control unit and providing a signal thereto upon passage of a mail item passed said fifth sensor, said control unit being configured to determine from said signal from said fifth sensor a distance that a mail item has moved into the extraction device.

10. A dynamic scale as claimed in claim 8 wherein said automatic feed station is configured to measure a length of each mail piece and is in communication with said control unit, and wherein said control unit is configured to determine, from the length measured by said automatic feed station, whether that mail piece has moved a predetermined distance into the extraction device.

\* \* \* \* \*